No. 666,660. Patented Jan. 29, 1901.
A. W. GABRIO.
LUBRICATING TROLLEY WHEEL.
(Application filed June 12, 1900.)
(No Model.)
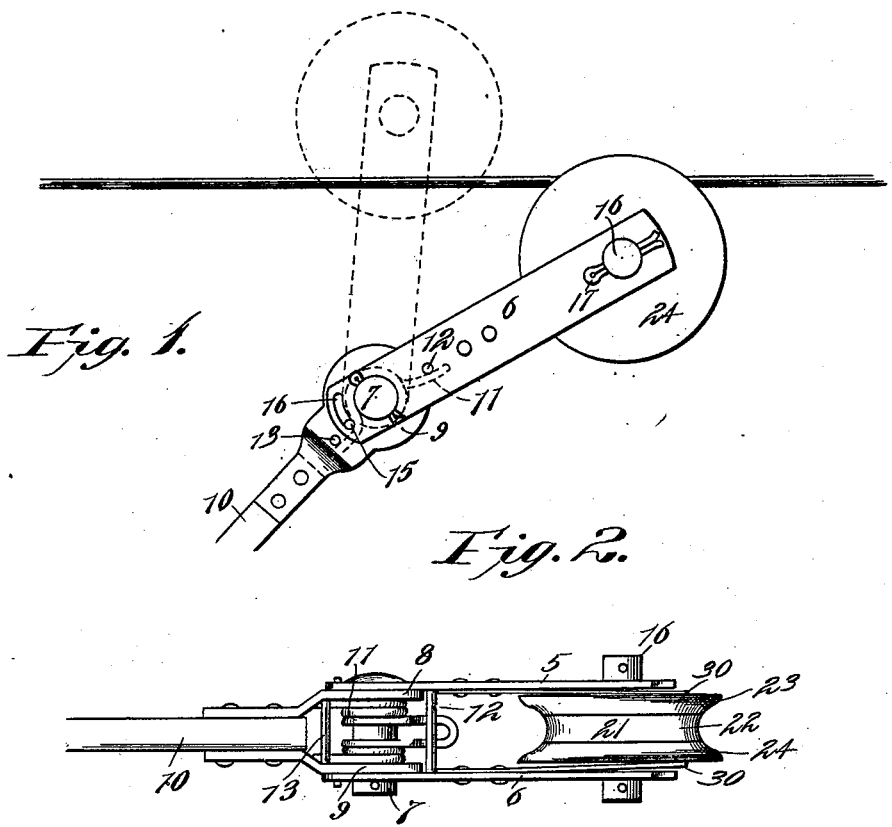
Witnesses
C. H. Walker
Geo. H. Chandler
A. W. Gabrio Inventor
by C. A. Snow & Co.
Attorneys

UNITED STATES PATENT OFFICE.

ALFRED W. GABRIO, OF HAZLETON, PENNSYLVANIA, ASSIGNOR OF ONE-HALF TO JOSIAH T. BERRYMAN, OF SAME PLACE.

LUBRICATING TROLLEY-WHEEL.

SPECIFICATION forming part of Letters Patent No. 666,660, dated January 29, 1901.

Application filed June 12, 1900. Serial No. 20,032. (No model.)

*To all whom it may concern:*

Be it known that I, ALFRED W. GABRIO, a citizen of the United States, residing at Hazleton, in the county of Luzerne and State of Pennsylvania, have invented a new and useful Lubricating Trolley-Wheel, of which the following is a specification.

This invention relates to trolley-wheels in general, and more particularly to that class employed in overhead-trolley electric-railway systems, one object of the invention being to provide a construction wherein the several working faces of the elements of the wheel will be thoroughly and automatically lubricated and in which, moreover, the lubricant will be supplied to the trolley-wire in such quantities as to prevent the adhesion of water thereto and the consequent formation of ice in cold weather.

Further objects and advantages of the invention will be evident from the following description.

In the drawings forming a portion of this specification, and in which like numerals of reference indicate similar parts in the several views, Figure 1 is a side elevation showing a trolley-arm provided with a wheel constructed in accordance with the present invention. Fig. 2 is a plan view of Fig. 1 with the trolley-wire omitted. Fig. 3 is a central diametrical section of the trolley-wheel, its shaft being shown in elevation. Fig. 4 is an edge view of the wheel, partly in section.

Referring now to the drawings, the trolley-wheel is shown as mounted between the sides 5 and 6 of a frame, and which sides are pivotally mounted at their opposite ends upon a shaft or pin 7, which is passed through the arms 8 and 9 of a yoke or hasp at the end of the trolley-arm 10. A spring-wire 11 is bent upon itself and its bight rests against a cross-pin 12, connecting the side plates 5 and 6, the wire beyond its bight being wrapped around the pin 7 and having its ends resting against a pin 13, engaged with the arms of the yoke. This spring-wire tends to hold the frame-plates at an angle to the trolley-arm, and the pivotal movement of the plates with respect to the yoke is limited by pins 15 upon the yoke, which engage arc-shaped slots 16 in the frame-plates 5 and 6, as shown.

The trolley-wheel is mounted rotatably upon a shaft 16, which is disposed in alining perforations in the plates 5 and 6, and is prevented from displacement by means of cotter-pins 17, which are engaged with perforations in the ends of the shaft.

The trolley-wheel consists of a central drum 20, midway of the ends of which is formed an annular flange 21, having a grooved periphery 22, which forms the bottom of the peripheral groove of the completed trolley-wheel, said flange being solid. Upon the central drum 20 and at each side of the flange thereon is rotatably disposed a wheel-section 23 and 24, respectively. Each of these sections is substantially disk-shaped, and they form the flanges of the complete wheel. Each of the sections 23 and 24 has its outer face slightly convex, while the peripheries thereof are concaved to conform to the curvature of the flange 21 of the drum 20, the inner faces of the sections 23 and 24 being adapted to lie snugly against the outer faces of the flange 21. In each of the sections 23 and 24 is formed an annular chamber 25 and 26, respectively, communicating with which is a threaded perforation 27 through the outer end or face of the section to permit filling the chamber therein, these perforations having plugs for closing them. From the chamber within the section 23 leads a radial passage or duct 27' to the shaft 16, through which the lubricant may be supplied to the shaft to lubricate the bearing between the drum 20 and the shaft, said duct being continued through the drum, as shown. Additional ducts 28 are formed through the inner faces of the sections 23 and 24 and adjacent the outer edges thereof to permit the lubricant to pass to the contacting faces of the flange 21 and the sections 23 and 24 and also to pass between said sections and their contacting portions of the drum 20. The lubricant that passes out between the several elements is partly carried by centrifugal and capillary action to the surface of the wheel in the groove thereof, from which it is carried by contact to the trolley-wire. By repeated trips over the wire the trolley acts to apply a thin coating of the lubricant thereto, saving a large percentage of the wear upon the trolley and the wire and also preventing the formation of ice in cold weather. With this construction of wheel it will be seen that no special form of trolley-arm is required, as the several separable parts thereof may be disposed upon the usual wheel-axle.

To hold the parts of the wheel yieldably in mutual contact, a spring-plate 30 is riveted or otherwise secured to the inner side of each of the frame-plates 5 and 6 and has its opposite end bifurcated to straddle the wheel-axle, so that said plate may bear with its free end against the outer face of an adjacent outer section of the trolley-wheel. These two spring-plates thus hold the outer sections 23 and 24 against the side faces of the flange 21, so that the parts of the wheel may have lateral bodily movement.

It will of course be understood that in practice various modifications of the construction shown may be made and that any suitable materials and proportions may be used for the various parts without departing from the spirit of the invention.

What is claimed is—

1. A trolley-wheel comprising a hub having an annular flange provided with a peripheral groove, a disk disposed rotatably upon the hub at each side of the flange and containing oil-chambers, said disks having peripheral grooves at their inner sides corresponding in curvature to the groove of the flange, and said disks having ducts leading from the oil-chambers to the faces of the flange.

2. A trolley-wheel comprising a hub having an annular central flange, a disk rotatably mounted upon the hub at each side of the flange and projecting radially therebeyond, said disks lying against the end faces of the flange, said disks having ducts leading from the chambers to the end faces of the flange against which they contact, to supply oil thereto and therefrom to the periphery of the wheel to coat the trolley-wire.

In testimony that I claim the foregoing as my own I have hereto affixed my signature in the presence of two witnesses.

ALFRED W. GABRIO.

Witnesses:
EDWARD TUMBACH,
ADAM EIDAM.